No. 615,278. Patented Dec. 6, 1898.
F. G. JOHNSON.
CRUSHING AND PULVERIZING MILL.
(Application filed Jan. 27, 1898.)

(No Model.) 4 Sheets—Sheet 1.

WITNESSES
Thomas Legatt
F. R. Johnson

INVENTOR
Frank G. Johnson

No. 615,278. Patented Dec. 6, 1898.
F. G. JOHNSON.
CRUSHING AND PULVERIZING MILL.
(Application filed Jan. 27, 1898.)

(No Model.) 4 Sheets—Sheet 2.

WITNESSES
Thomas Leak.
F. R. Johnson

INVENTOR
Frank G. Johnson.

No. 615,278.  
F. G. JOHNSON.  
CRUSHING AND PULVERIZING MILL.  
(Application filed Jan. 27, 1898.)  
Patented Dec. 6, 1898.

(No Model.)

4 Sheets—Sheet 4.

WITNESSES

INVENTOR

UNITED STATES PATENT OFFICE.

FRANK G. JOHNSON, OF NEW YORK, N. Y.

CRUSHING AND PULVERIZING MILL.

SPECIFICATION forming part of Letters Patent No. 615,278, dated December 6, 1898.

Application filed January 27, 1898. Serial No. 668,189. (No model.)

*To all whom it may concern:*

Be it known that I, FRANK G. JOHNSON, a citizen of the United States, residing at New York, (Port Richmond,) in the county of Richmond, State of New York, have invented a new and useful Crushing and Pulverizing Mill, of which the following is a specification.

The nature and general construction of my invention are such that I utilize both the action of gravity and centrifugal force by the employment of a continuous series of balls horizontally and circularly placed between two heavy plates, both plates having an annular channel on their adjacent faces vertically opposite to each other corresponding to the size of the balls and the balls being horizontally revolved on the bottom plate by rotating the upper plate on the top of the balls.

The general object of my invention is the crushing and pulverizing to a powdered form a variety of substances, particularly various ores, lime, plaster, cements, sand, &c., and my special aim is to combine in my device the action both of crushing and rubbing, and by such contrivance as to perform the work rapidly, and to reduce the material to the greatest required attenuation, and with the least possible consumption of power, and render the mill durable and little liable to breakage of any of its parts, all of which I attain by the mechanism illustrated in the accompanying drawings, consisting of four sheets, in which—

Figure 1:
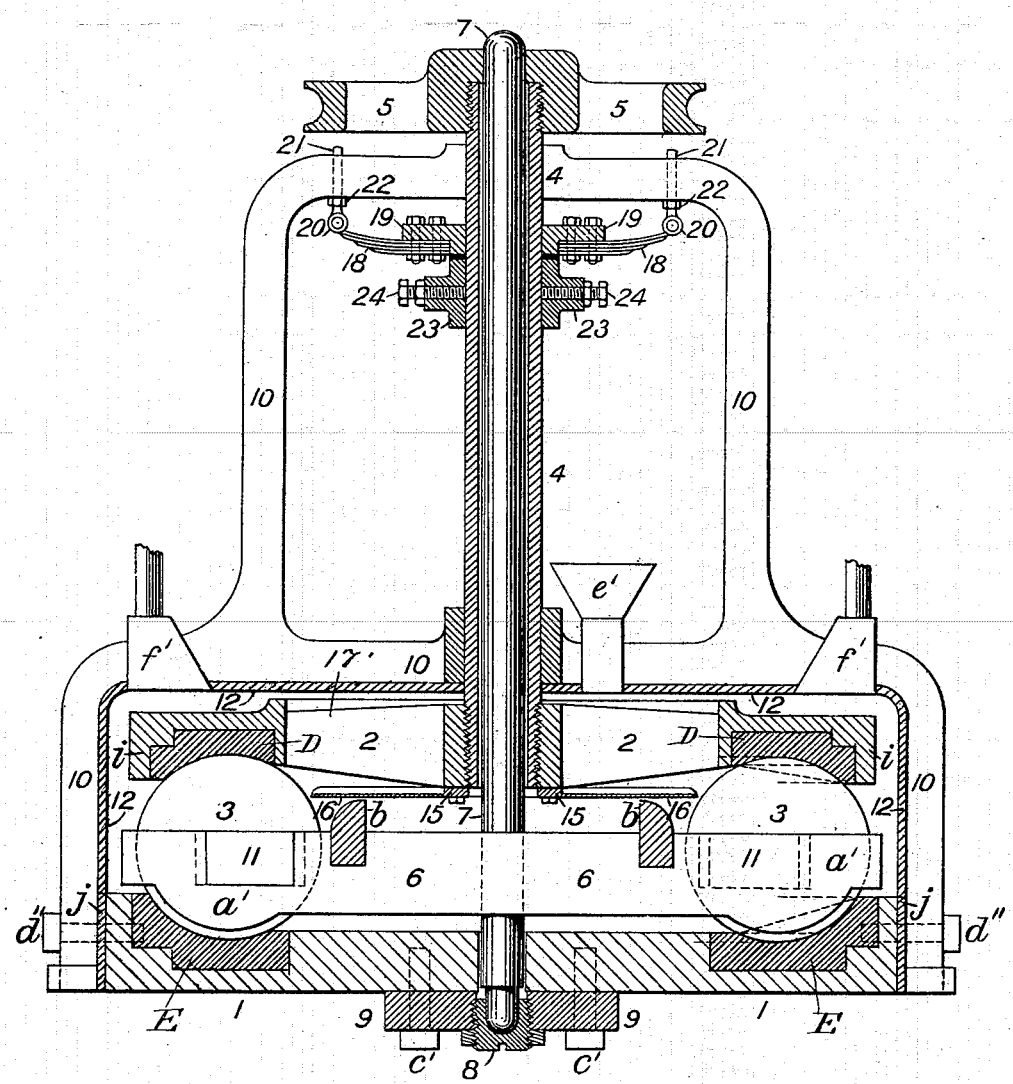
Figure 2:
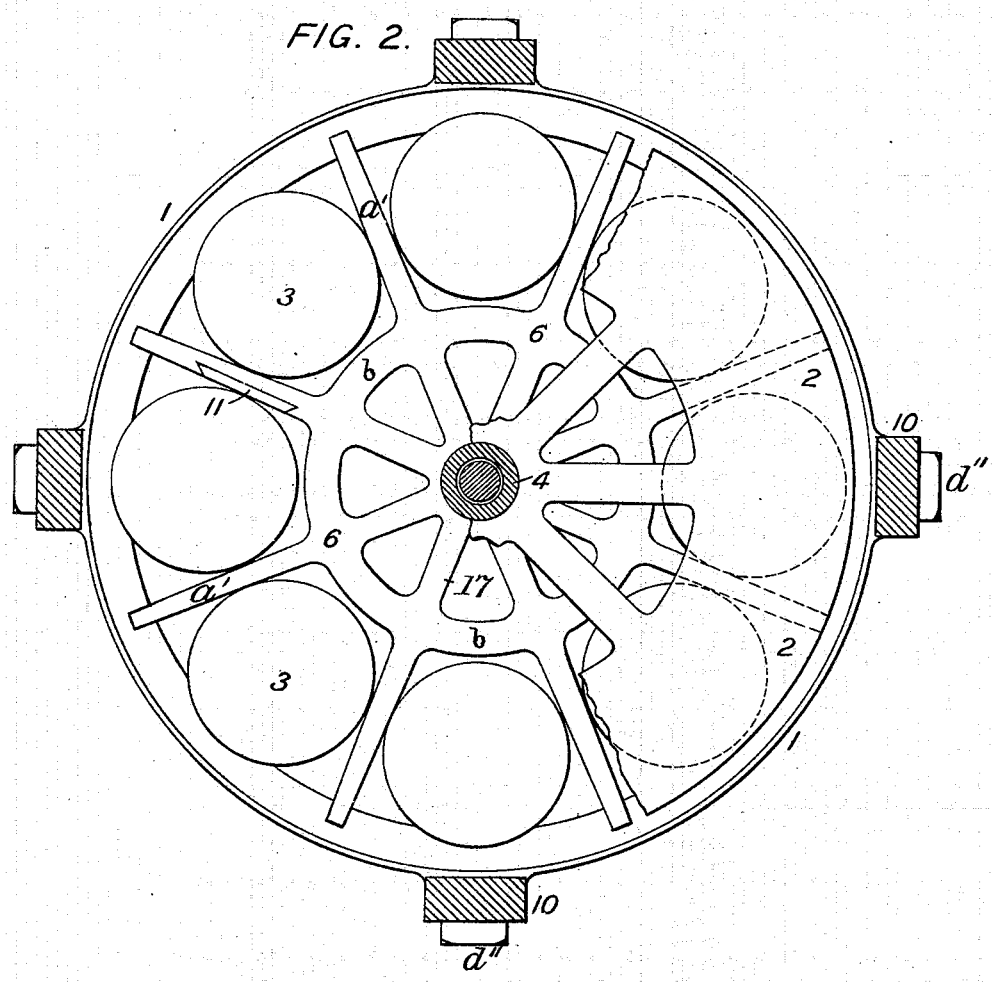
Figure 3:
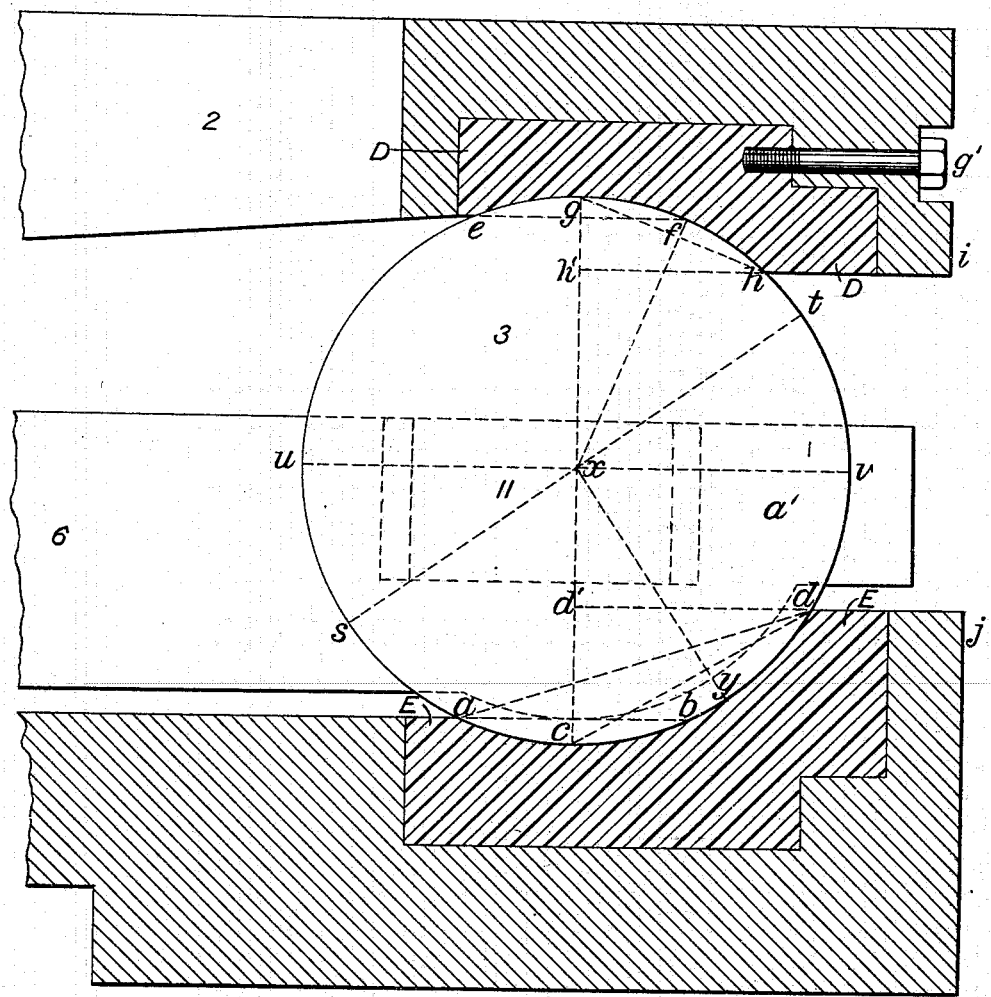

Figure 1 is an elevation through the center of the mill so drawn as to divide two opposite balls through their centers; Fig. 2, a plan view with the greater portion of the top plate removed to expose to view the balls and the bottom plate and the scraper; Fig. 3, an enlarged view of one of the balls and one of the blades of a scraper and a portion of the upper and lower plates, showing embedded therein steel dies; and Fig. 4, an enlarged plan view of a feeder arranged to throw a portion of the material to be reduced between the top plate and the balls.

Similar numerals and letters of designation refer to similar parts throughout the several views.

1 1 is a heavy circular stationary cast-iron plate, which I will term the "tread-plate," to be set horizontally on heavy flooring or on concrete or other masonry foundation. The central portion of the upper face of this tread-plate is flat, but is channeled in the form in cross-section of a segment of a circle in its outer portion to conform to the shape and size of the balls. This annular depression below the face of the plate (shown by the dotted chord $a\,b$ in Fig. 3) is slight, being but about one-tenth of the radius of the balls; but the outer portion of this plate—that is, the portion outside of the vertical diameter of the balls—is projected upward at a distance from the lowest point of the annular channel equal to half the radius of the balls, as shown by the dotted chord $c\,d$ and dotted line $d\,d'$, and is extended outward some distance beyond the balls to provide for the wearing away of this portion of the plate.

2 2 is a heavy circular rotating cast-iron plate resting upon the top of and horizontally supported by the series of balls 3 3. This plate, for convenience, I will term the "motor-plate." The central portion of this motor-plate is spoked to allow the material to be pulverized to pass down through it to the tread-plate, and the lower side of its outer portion is formed the same as the upper side of the tread-plate, its annular channel being of the same depth, as shown by the dotted chord $e\,f$; but the downward extension of its outer portion—that is, the portion outside of the vertical diameter of the balls—is only half as great as the upward extension of the outer portion of the tread-plate, it (the said downward projection) being one-quarter of the radius of the balls, as shown by the dotted chord $g\,h$ and dotted line $h\,h'$. The reasons for forming the upper side of the tread-plate and the lower side of the motor-plate in this peculiar manner will be given when I come to explain the operation of my device.

3 3 is a series of metallic balls, practically perfect spheres, the preferable number being eight, and made, preferably, of hard steel or chilled iron and placed in a circular position between the said two plates—that is, in the said annular channels formed in the said plates, as above described—these balls being of such size as to fill the horizontal circle in which they are placed, save leaving sufficient space between them to freely admit the blades *a' a'* of the scraper 6 6, the balls also to be of such diameter as to fit the annular channels in the two said plates.

4 4 is a vertical hollow motor-shaft held by suitable bearing-boxes placed in the shaft-holding frame 10 10. On top of this hollow shaft is mounted the driving-pulley 5, which may be operated by a horizontal wire cable or a belt or by beveled gear. The bottom of this motor-shaft is secured to the motor-plate 2 2, by which it (the motor-plate) is rotated on the top of the balls.

6 6 is a scraper which distributes within the chamber of the mill the material to be reduced and prevents it from becoming compacted on the pulverizing-surfaces or in any part of the mill. This scraper consists of a single rigid piece of cast metal, preferably cast-steel, of the spider form—that is, it has a hub and its central portion is spoked to admit the passage of the material to be reduced down through it to the tread-plate. At the outer end of the spokes is a circular section *b b* in the form of a ring to unite the outer ends of the spokes and scraper-blades *a' a'*, and it (the ring) extends up above the level of the spokes (see Fig. 1) to prevent the material to be pulverized from being thrown out between the balls before it drops on the tread-plate. From this annular section or union ring is radiated a series of as many scraper-blades *a' a'* as there are balls, (being eight) and each one of these scraper-blades extends out between and beyond each two of the balls, the upper edges of which blades are straight and somewhat above the diameters of the balls, and the lower edges of the said scraper-blades are shaped to conform to the upper surface of the tread-plate and its annular channel. This scraper is rigidly mounted on the scraper-shaft 7 7, which said shaft passes through; but is free and independent of the hollow motive shaft 4 4. The upper end of this scraper-shaft is held by and independently rotates in the driving-pulley 5, as shown in Fig. 1, and its lower end is supported by and rotates in any adjustable screw-post 8, which is secured to the bottom of the tread-plate 1 1 by the plate 9 9 and tap-bolts *c c*. As different materials to be pulverized require the scraper-blades to run at somewhat different distances from the tread-plate, they are thus made vertically adjustable by turning the screw-post 8 up or down, as the case may require.

The scraper is rotated by the impingement and motion of the balls against the scraper-blades, each ball pushing its respective scraper-blade in front of it.

To diminish the wear of the scraper-blades by the rotation of the balls against them, each scraper-blade is provided with a chilled-iron or hardened-steel disk 11 11, which I will term the "ball-contact" plates, one being set into the back face of each scraper-blade in front of each ball by means of a dovetail slot formed in the scraper-blades, which are conveniently and inexpensively renewed when worn out.

10 10 is a quadrangular shaft-holding frame secured to the periphery of the tread-plate by the tap-bolts *d" d"*.

12 12 is a sheet-metal case or chamber, covering and inclosing the entire mill except the shaft-holding frame and the upper portion of the two shafts and the driving-pulley.

*e'*, Fig. 1, is a hopper through which is fed the material to be pulverized, and *f' f'* are openings in the chamber to which to attach suction-pipes for drawing off the material as fast as it becomes sufficiently reduced.

Though the tread-plate 1 1 and the motor-plate 2 2 can be made entirely of cast-iron and do good service, yet cast-steel is preferable, but too expensive. Therefore I have provided, as shown in Fig. 3, annular steel shoes or dies E E and D D in which to make the annular channels and of which to form the upward projection of the tread-plate and downward projection of the motor-plate, which said dies will take all the wear of the balls and which can be replaced when worn out. These annular dies are recessed into and held in their respective plates by corresponding annular sockets formed in the said plates, as clearly shown by Fig. 3. These annular dies are made thickest where the wear will be greatest. The one in the motor-plate is secured from dropping out of place while being handled by the bolts *g'*.

The function of the upward projection on the outer edge of the tread-plate and downward projection on the outer edge of the motor-plate is twofold—namely, to provide rubbing surface for the balls and to hold the balls against centrifugal force.

Figure 4:
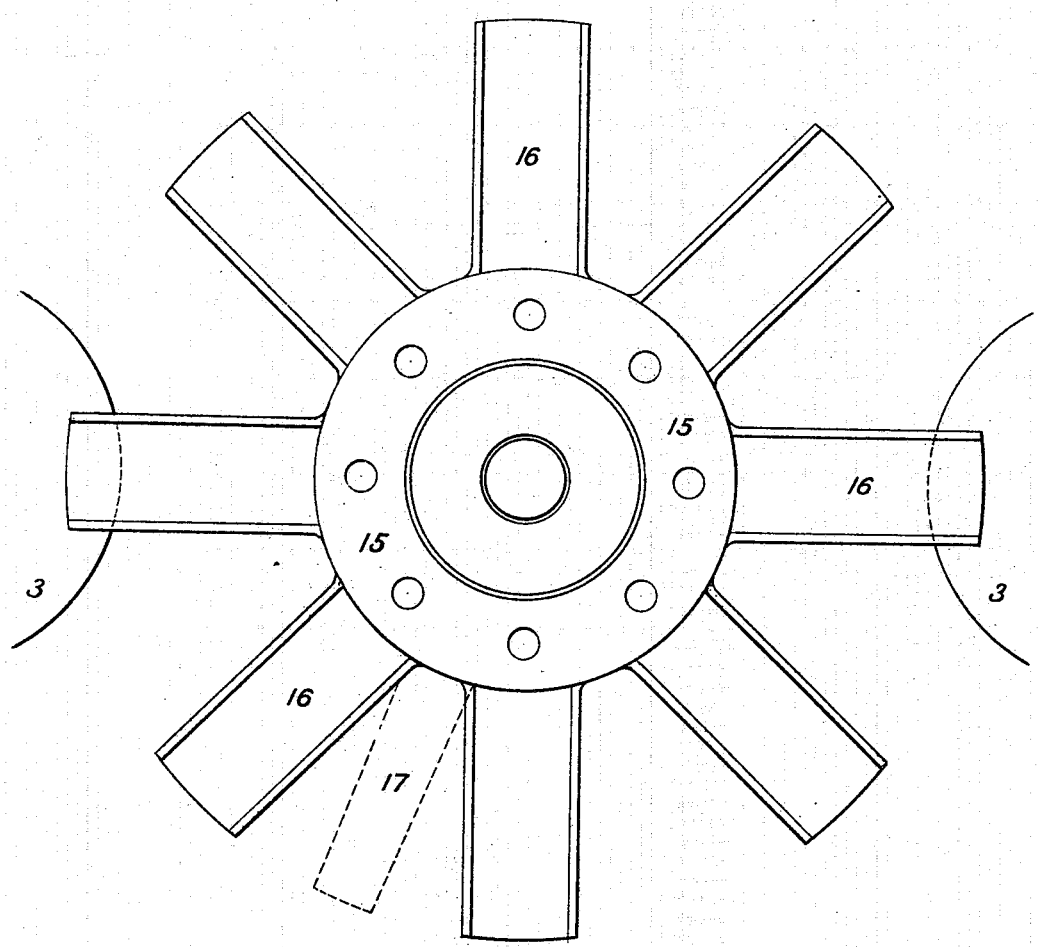

Fig. 4 represents a plan view of a feeder, which is a simple casting consisting of a hub 15 with a circular opening at the center equal to the size of the motor-shaft, from which (the hub) radiates a series of troughs, 16 16, (shown also in Fig. 1) and as many troughs as there are balls. This feeder is bolted concentric with and to the lower side of the motor-plate and in such a position that the spokes of the motor-plate (one of which, 17, is shown in dotted lines in Fig. 4) will stand between the troughs of the feeder, which will prevent the said spokes from obstructing the flow of a portion of the material into the said troughs.

18, Fig. 1, are leaf-springs, being two standing opposite to each other, or preferably there may be four standing at right angles to each other, corresponding to the cross-bars of the quadrangular shaft-holding frame 10 10. The fixed ends of these springs are bolted to the flange portion of the sliding collar 19 19, and the yielding ends of the said springs are held by the yokes 20 20, which have a threaded extension passing up through the cross-bars of the frame 10 10. Between the bars of the frame and the spring-holding yoke are nuts 22. By turning up these nuts the springs are put under tension. To throw the tension of the springs onto the motor-shaft and in turn upon the motor plate and balls, the fixed collar 23 23 is fastened to the motor-shaft by the set-screws 24 24.

To show the power of this style of mill, it will not be inappropriate to say that its smallest proposed size takes balls somewhat more than twelve inches in diameter, weighing three hundred pounds each, and the largest size has balls weighing about fifteen hundred pounds each, while the weight of the different motor-plates, with the motor-shaft and drive-pulley bearing upon the balls, will weigh from two to four tons, which gives from eight hundred to two thousand pounds crushing and pulverizing force to each ball by gravity alone, to say nothing of their centrifugal action.

Having pointed out the various parts of my device and their functions and shown their relation one to another, I will now explain the operation of my invention and allude to some of its advantages.

By rotating the driving-pulley, and so the motor-shaft, the motor-plate rotates the balls by application of the motive power to the top of the balls, which gives a leverage of the motive power to overcome obstructions at the bottom of the balls equal to the whole diameter of the ball, thereby requiring much less power to drive them forward than would be needed if the motive power were applied at the center of the balls. By this method of driving the balls the motor-plate travels in its rotation twice as fast as the balls. Therefore the scraper and its blades rotate only half as fast or often as does the motor-plate, and this is the reason why the scraper is mounted on a separate shaft and allowed to revolve independently of the motor-shaft. The lower edge of the scraper-blades conforming to the form of the upper face of the tread-plate and being vertically adjustable can be set so as to prevent only such an amount of material from falling or accumulating under the balls as will be most advantageously affected by the same. The series of radial troughs secured to the bottom face of the more rapidly rotating motor-plate throws a portion of the material to be reduced in a radially-horizontal direction, and thereby directs a portion of it to the top of the balls, where it is caught, crushed, and pulverized between the motor-plate and the top of the balls, which so far utilizes the quickest action of the mill. That part or balance of the material which falls by gravity to the bottom plate is by the scraper and its blades moved outward into the lower annular channel, and thereby prevented from passing beyond the same until the series of balls passes over and reduces it, whence it or the sufficiently-reduced portion thereof is drawn off by atmospheric action through the discharge-openings $f'$ $f'$, Fig. 1. The action between the series of balls and both the tread-plate and motor-plate is that of crushing and rubbing, as illustrated by Fig. 3, and explained as follows, reference being had to Fig. 3: It is found with a mill of this construction that any given axis of each of the balls is constantly changing position or direction, so that all parts of the surface of the balls are by use worn alike, which keeps them perfectly round, whereby they can be materially worn away without greatly impairing their use.

If the mill is run at a very low speed, the crushing action occurs chiefly at the bottom and top of the balls in the vertical direction shown by the line $c\,g$, Fig. 3, and the ball will revolve on the axis $u\,v$, and the rubbing action between the ball and the tread-plate will occur in graduation from $c$ to $a$ and from $c$ to $d$, and it is the same at the top between the motor-plate and balls. If, however, the mill is run with considerable velocity, causing the development of a corresponding centrifugal force, the chief crushing effect will be somewhere between $c$ and $d$—for instance, at the point $y$—in which case the ball will have the greatest tendency to revolve around the axis $s\,t$, causing the rubbing action to take place from $y$ to $a$ and from $y$ to $d$, in which case also there will be rubbing action between the motor-plate and ball from $e$ to $h$. This is as it should be, for the reason that the finer and also the partially-reduced particles of the material are caught between the motor-plate and balls, while the coarser and uncrushed portion falls between the tread-plate and balls. Hence it is evident that by varying the velocity of the mill the resultant force of gravity and centrifugal action can be made to fall on any desired point of the tread-plate from $c$ to $d$, preferably about midway from $c$ to $d$, which would require the mill to be run only at a moderate and economical speed. In fact, it is one of my leading objects to attain satisfactory results without running the mill at high speed.

The foregoing explanation has no reference to tension which may be given by the downward action of the springs on the motor-shaft and so on the balls.

It will not be out of place to here suggest that it is impossible for a crushing and pulverizing mill, however constructed, to do much work without considerable wear to the parts that do the pulverizing. This is to be expected. The chief object, therefore, is to obtain maximum results with minimum wear.

Some of the advantages of my device besides those already alluded to are: The greatest part of the weight of the entire mill falls upon the material to be crushed and pulverized instead of depending wholly upon centrifugal force, which must be developed at the expense of power. I employ a large number of balls in a small space and provide, consequently, a correspondingly large number of crushing-points and multiplied rubbing-surfaces, which also keep down the cost of the mill. The method of revolving the balls by applying the power at the top of the same requires the least possible power to run the mill. The balls keep round, and therefore may be considerably reduced in size by wear without materially diminishing the efficiency of the mill. The balls and dies can be renewed without great expense, whereby the mill becomes as good as new, for the reason that outside of the chamber there is no part that may not be run for years without renewal. The only rubbing contact within the chamber that would seem to require renewal, except after a reasonable time of general use, is where the balls impinge against the scraper-blades; but provision is made for convenient and inexpensive repair of these parts. Besides in proportion to the wear of these points a corresponding amount of pulverization is performed to offset the wear. In fact, it is possible and practicable to use this mill with reasonable success with only the following parts—namely, the tread-plate 1 1, the balls 3 3, the motor-plate 2 2, and its shaft 4, provided the drive-pulley is placed not far from the motor-plate. Not even a shaft-supporting arm is included. This is the foundation of the construction of my claims.

Having quite fully described the construction and explained the operation and advantages of my invention, what I claim as new and useful, and desire to secure by Letters Patent, is—

1. In a crushing and pulverizing mill, an upper horizontal motor-plate having an upward-extending hollow motor-shaft and a bottom stationary tread-plate and a continuous series of circularly-placed balls between the two said plates the said motor-plate resting on and supported by the said balls and the said balls resting on and supported by the tread-plate the said plates having a horizontally-circular and vertically-extending projection approaching each other on their outer edges and beveled and curved on the inner side thereof to conform to the surface of the said balls, in combination with a vertically-adjustable scraper having a series of radial scraper-blades mounted on a vertically-adjustable shaft passing through the said hollow motor-shaft the said radial scraper-blades being extended out to the periphery of the said motor-plate and having their lower edges conformed to the upper face of the said tread-plate, and standing alternately between the said balls, whereby the scraper independently of the motor-plate is rotated by the impingement of its radial blades on and by the motion of the balls, substantially and for the purpose described.

2. In a crushing and pulverizing mill, the horizontal top motor-plate, 2 2, having the upward hollow motor-shaft, 4, and the downward-extending projection, $i\ i$, the continuous series of balls, 3 3, the tread-plate, 1 1, having the upward-extending projection, $j\ j$, the scraper, 6 6, having the ball-separating blades $a'\ a'$ and vertically-adjustable shaft, 7 7, placed within but independent of the said hollow motor-shaft, in combination with the inclosing chamber, 12 12, and shaft-holding frame, 10 10, substantially as and for the purpose set forth.

3. In a crushing and pulverizing mill, the horizontal top motor-plate, 2 2, having the annular embedded steel die, D D, the downward-extending projection, $i\ i$, the radial feeder, 15 16, and upward-extending hollow motor-shaft, 4, the continuous series of balls, 3 3, the stationary tread-plate, 1 1, having the annular embedded steel die E E, and the upward-extending projection, $j\ j$, and the scraper, 6 6, having the radial ball-separating scraper-blades, $a'\ a'$, the ball-contact plates, 11 11, and the vertically-adjustable shaft, 7 7, in combination with the inclosing chamber, 12 12, and shaft-supporting frame, 10 10, as and for the purpose described.

FRANK G. JOHNSON.

Witnesses:
E. H. GOURLEY,
E. C. SHEA.